March 28, 1967    K. T. WILSON    3,311,354
LEAKPROOF MOTION TRANSMITTER
Filed Oct. 21, 1965
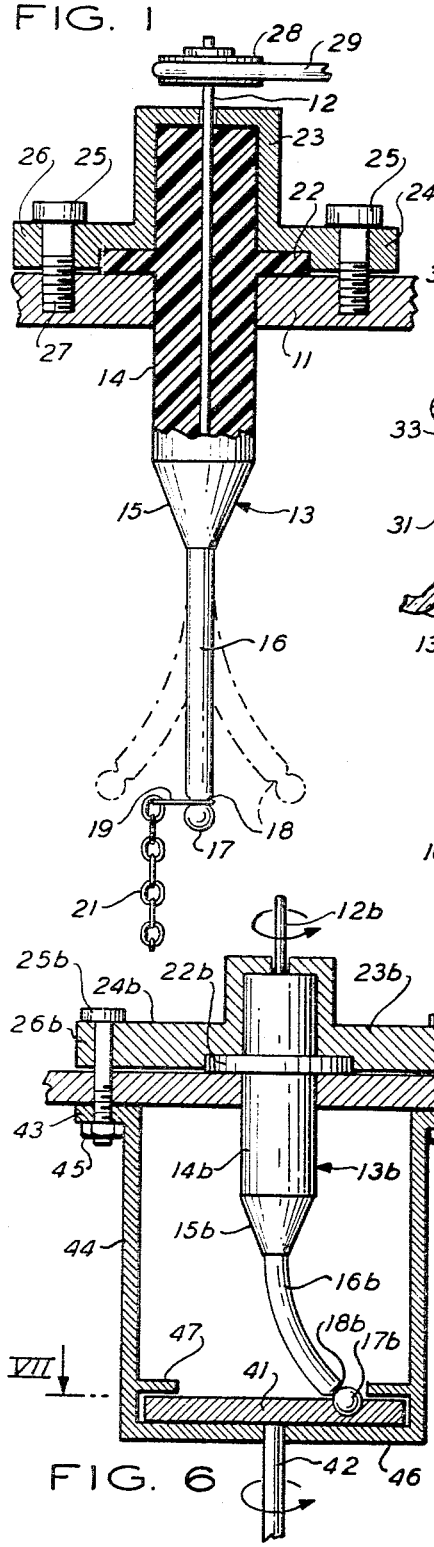
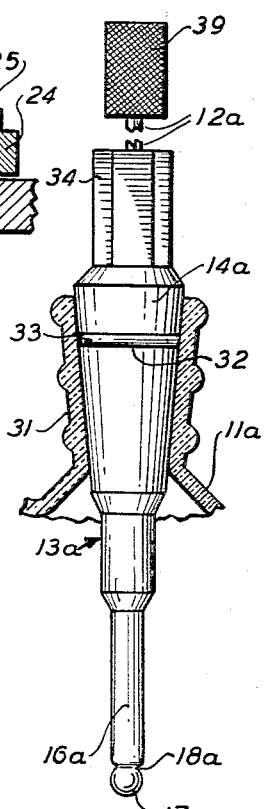
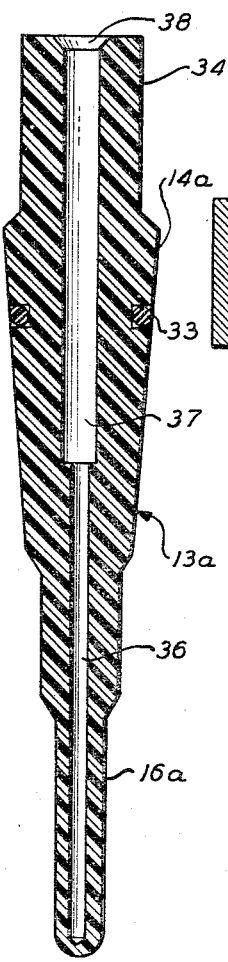
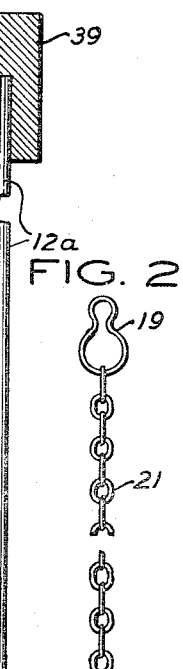
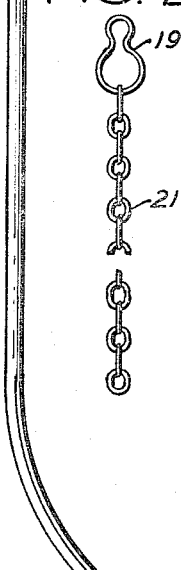
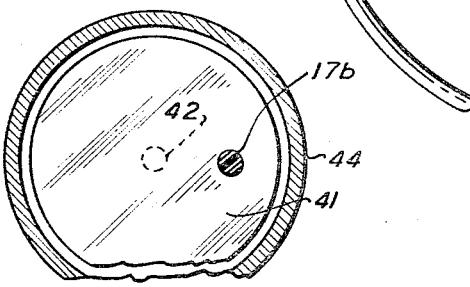
INVENTOR
KENNETH T. WILSON
*Towson Price*
BY    ATTORNEY United States Patent Office 3,311,354
Patented Mar. 28, 1967

3,311,354
LEAKPROOF MOTION TRANSMITTER
Kenneth T. Wilson, 45 Eagle Rock Ave.,
Roseland, N.J. 07068
Filed Oct. 21, 1965, Ser. No. 499,681
8 Claims. (Cl. 259—122)

This invention relates to means for transmitting stirring or other rotary motion without any possibility of leakage.

Many different means have heretofore been proposed for transmitting stirring or other rotary motion, while avoiding the possibility of leakage, as from a reactor vessel, or other container, which holds liquid or other material to be stirred. However, such arrangements have not been entirely satisfactory insofar as sealing a rotatable shaft, especially such made of glass, and where it is desired to keep the rotating friction low and avoid the development of much heat. When all-glass fluid seals and glass stirring rods are used, there has been extensive wear resulting in leakage and breakage. When glass is not used, it has been necessary to make frequent replacements because of the action of chemicals on materials which have been employed.

It is, therefore, an object of my invention to provide a leakproof transmitter, for stirring or other rotary motion, which is completely free of any rotating seal, packing gland, or the like.

A further object of my invention is to provide such a leakproof transmitter for which a wide range of elastomers, such as Teflon, Kel-F, polyvinyl chloride, vinyl, and soft rubber, are available, as well as metallic structures, if the motion does not exceed the limit of elasticity, as in the larger sizes.

A still further object of my invention is to provide such a leakproof unit involving low friction and low vibration, with no possible contamination by a lubricant.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a vertical sectional view, with parts in elevation, of a container with a closure device and an associated leakproof transmitter for stirring or other rotary motion associated therewith and carrying a stirrer chain.

FIGURE 2 is an elevational view of the chain, formed of gold or other inert metal, which in FIGURE 1 is shown associated with the lower end of the flexible leakproof cover of the transmitter.

FIGURE 3 is an elevational view, with parts in vertical section, of a modified form of the leakproof transmitter illustrated in FIGURE 1.

FIGURE 4 is an axial sectional view of the flexible leakproof cover of the transmitter illustrated in FIGURE 3, but slightly modified.

FIGURE 5 is an elevational view, with a part in vertical section, of the shaft for transmitting motion to the flexible leakproof cover, but separated from said cover.

FIGURE 6 is an elevational view, with parts in section, of an embodiment of my invention similar to FIGURE 1, but employed for transmitting motion rather than merely stirring a liquid.

FIGURE 7 is a horizontal sectional view on the line VII—VII of FIGURE 6, in the direction of the arrows.

Referring to the drawings in detail, and first considering the embodiment of my invention illustrated in FIGURE 1, there is shown a portion of a container 11 which may be of suitable material including metal, through the top wall of which passes a shaft 12. The lower portion of said shaft 12 is encased in a flexible cover 13 which is formed of suitable leakproof material, examples being Teflon, Kel-F, polyvinyl chloride, vinyl, and soft rubber. The upper portion 14 of the cover 13 is relatively large in diameter and tapers along a portion 15 to a stirrer portion 16 which is not much larger in diameter than the diameter of the shaft 12.

The stirrer portion 16 may have a knob 17 formed at its lower end. Between the knob 17 and the remainder is a neck 18, over which fits a connecting member 19 for a chain 21, shown in detail in FIGURE 2, which may be formed of gold, platinum, titanium, or other material inert to the matter in the container 11, which is to be stirred. The function of the chain is to give an increased sweep to the stirring range of the lower portion of the stirrer part 16.

The stirrer portion 16, while normally straight, as indicated in full lines in FIGURE 1, is curved by having the enclosed shaft 12 provided with a curved lower portion, the curvature of the lower portion, however, being through an arc subtending less than a right angle, so as not to make it too difficult to insert the shaft into the cover. Although shown as one piece, the cover 13, if of thermoplastic material, may be built up by welding together the parts of differing cross-section.

In order to have a leakproof connection between the cover 13 and the container 11, said cover is, in the present embodiment, provided with an outstanding annular flange 22 which is held in tight, leakproof engagement with the top surface of the container 11. This is accomplished by having means for clamping said cover 13 to the container comprising a housing 23 for the upper part 14 of the cover 13 which desirably neatly fits the same, as illustrated, and through which the upper part of the shaft 12 extends.

Said housing is provided with an outstanding desirably annular flange 24 at its lower end to engage the flange 22 outstanding from the cover 13 and hold it in tight engagement with the top surface of the container 11. This is accomplished by fastening means, such as set screws or bolts 25 passing through the peripheral desirably thickened portion 26 of the housing flange 24 and threadably engaging the top wall of the container 11, as indicated at 27. The thickening at 26, beyond the normal thickness of the flange 24, is desirably less than the thickness of the flange 22. Thus, when the housing 23 is clamped in the position shown in FIGURE 1, there is some space between the lower surface of the thickened portion 26 and the top surface of the container 11, allowing the flange 22 to be clamped tightly against said upper surface to thereby prevent any possible leakage therebetween.

The upper end portion of the shaft 12 is provided with means for rotating said shaft such as a pulley 28, driven by a belt or other driving means 29. When so operated, it will be seen that, while the shaft rotates about its axis, the leakproof cover 13 is not turned, but the lower portion thereof oscillates around and back and forth between the extremes represented by the dot-dash lines, while the lower end of said stirrer portion 16 describes a circle about the axis of the shaft 12, while not turning about its own axis.

Referring now to the embodiment of my invention as illustrated in FIGURE 3, there is shown a fragmentary portion of a flask, kettle, reactor, or other container 11a, desirably formed of glass. The opening in the neck 31, or other necked opening, not shown, may serve for the reception of materials to be reacted in the container. Said opening in the neck 31 is adapted to be closed by the large section 14a of a flexible leakproof cover 13a.

said large section, in this embodiment, is desirably tapered, as illustrated, and may be grooved, as indicated at 32, to receive an O-ring or other sealing device 33. As in the preceding embodiment, the lower portion of the cover 13a is reduced in section to a lower stirrer portion 16a and terminates in a ball 17a connected by a neck 18a. Thus, if desired, a chain such as designated 21 in the first embodiment and shown in detail in FIGURE 2, may be connected to its lower end for the same purpose.

The upper portion 34 of the cover 13a may be of any desired shape in plan, here shown as octagonal. The interior of the cover 13a may be as represented in FIGURE 4, except that FIGURE 4 also shows an embodiment in which the ball 17a is omitted, but otherwise as in FIGURE 3. Thus, the larger desirably tapered section 14a may be of a diameter and length of a standard taper or ball joint. It may include a flare, flange or threaded type of mounting, in order to make a leakproof connection with the container 11a.

The portion 13a below this which is gradually reduced to the stirrer portion 16a, is of a length to be determined by the required length of the unit inside the flask or other container. The portion above the top surface of the flask, or other container, is of a cross-section and length to be determined by the joint size and size of the clamps to be used for holding it in place.

The size of the bore 36, shown in FIGURE 4, is to be determined by the size of the unit, but is seldom less than ⅛ inch in diameter. The outside diameter of the section 16a is determined by the strength required, the size of the bore, and that of the unit.

The lower end of the stirrer portion 16a may be machined or otherwise formed to receive an attachment, such as the chain 21 of FIGURE 2, to increase the range of stirring action, or the ball 17a may be omitted, as represented in FIGURE 4, and no chain employed. The upper portion of the bore 36 may be enlarged, as represented at 37 in FIGURE 4, for clearance with respect to the shaft 12a, as well as permit the use of some lubrication such as mineral oil or glycerine. The upper portion 34, here shown as octagonal, may be many-sided, knurled, or made decorative, as desired. The upper end of the bore 37 may be flared, as indicated at 38, to more readily receive a lubricant. However, this is not absolutely necessary.

The function of the O-ring, or other sealing device 33, is to insure against leakage, and it is set in the tapered portion 14a. Such insures a tight seal at the joint itself, regardless of the expansion or contraction of the elastomer. The shaft 12a, FIGURE 5, desirably stainless steel, is bent at its lower portion to get the desired diameter of rotation. The bend also holds the cover 13a in place. The shaft 12a is affixed to an enlarging or reducing bushing 39 by soldering, swaging, or threading. Such a bushing 39 is used to enlarge or reduce the shaft to fit the stirring motor used, if such stirring means is employed.

Referring now to the embodiment of my invention illustrated in FIGURES 6 and 7, there is shown a portion of a container 11b which may be of suitable material, including metal, through the top wall of which passes a shaft 12b turnable by suitable means, examples being given in connection with the preceding embodiments. The lower portion of said shaft 12b is encased in a cover 13b which is formed of suitable leakproof material, as in the first embodiment. The upper portion 14b is relatively large in diameter and tapers along a portion 15b to a turner portion 16b, corresponding with the stirrer portion 16 of the first embodiment, which is not much larger in diameter than that of the shaft 12b. The turner portion 16b may have a knob 17b formed at its lower end. Between the knob 17b and the remainder is a neck 18b, leaving a ball-shaped lower end of greater extent than a hemisphere.

The curved portion at the lower end of the shaft 12b desirably subtends less than a right angle, but is of an amount sufficient to give the required oscillating action to the lower end of the portion 16b in order to effect turning of the disc 41 secured to the upper end of a driven shaft 42 by engaging it.

In order to have a leakproof connection between the cover 13b and the container 11b, said cover is, in the present embodiment, provided with an outstanding annular flange 22b which is held in tight leakproof engagement with the top surface of the container 11b. This is accomplished by having means for clamping said cover 13b to the container comprising a housing 23b for the upper part 14b of the cover 13b, which desirably neatly fits the same, as illustrated, and through the upper end of which the shaft 12b extends.

Said housing 23b is provided with an outstanding desirably annular flange 24b at its lower end to engage the flange 22b outstanding from the cover 13b and hold it in tight engagement with the top surface of the container 11b. This holding is accomplished by fastening means, such as bolts 25b, passing through the peripheral desirably thickened portion 26b of the housing flange 24 and the top wall of the container 11b. The lower end portions of these bolts pass through an outstanding flange 43 formed at the top of an upwardly opening housing 44 for the disc 41 and its shaft 42. The ends of the bolts extending below the flange 44 carry holding nuts 45. The lower wall 46 of the housing 44 carries the disc 41 and is apertured to receive the shaft 42. The disc 41 is held in place by flange means 47 overlying its peripheral portion with sufficient clearance between its lower surface and the upper surface of the disc 41 to allow for smooth running of said disc 41.

It will, thus, be seen that, while my device is primarily designed for stirring, yet it may also be used for transmitting motion, as to a disc 41 on a shaft 42, without any possibility of leakage from or to a container such as 11b. The shaft 12b is, of course, driven by suitable means, such as indicated at 28 in FIGURE 1 and 39 in FIGURES 3 and 5.

From the foregoing disclosure it will be seen that I have provided a novel form of leakproof transmitter for rotary motion which is completely free of any rotating seal or packing gland. There is no hole, shaft, or other device that penetrates into the closed system. A wide range of elastomers is available for the cover member. The unit has low friction and is of low vibration. The fatigue life of the elastomer employed may be very high. There is no possible contamination from a lubricant since there is no entrance for such into the container. The unit will not leak, even though subjected to extreme pressures, and it can be easily cleaned. There is no possible binding or seizing of the rotating part. No fragile parts are used, whereby breakage is avoided.

Possible uses for the aforedescribed device are for stirrers in vacuum and pressure vessels, permitting the use of parts, if desired, of very small sizes. My device may be used under-sea in connection with controls, mechanical actuation, and rotary drives for locomotion. It may be used in space for actuation outside of a spaceship, seals for drives, and other rotary motion, without leaks.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims.

I claim:

1. A leakproof transmitter for rotary motion comprising a generally straight shaft for transmitting motion, one end part of said shaft being curved through an arc subtending less than a right angle, a flexible leakproof cover having a bore for the curved end part and the adjacent part of the straight portion of said shaft, and means for clamping the cover in leakproof engagement with a container while allowing the shaft to turn therein.

2. A leakproof transmitter as recited in claim 1, wherein there is a chain depending from the lower end portion of said leakproof cover to increase its stirring range.

3. A leakproof transmitter as recited in claim 1, including means for turning the shaft about the axis of its straight portion with respect to the cover, whereby the portion of the cover enclosing the curved portion oscillates about said axis without bodily turning, to effect a stirring or other desired transfer of motion.

4. A leakproof transmitter as recited in claim 1, including in combination, a container wherein the cover forms a closure device therefor, said leakproof transmitter extending through said closure device, and the means for clamping the closure device in leakproof engagement with said container comprises a flange outstanding from an intermediate portion of said device, a housing for the upper part of said device and through which the upper part of said shaft extends, said housing having an outstanding flange at its lower end engaging the flange outstanding from the closure device, and means for clamping said housing flange over said outstanding closure device flange.

5. A leakproof transmitter as recited in claim 1, including, in combination, a container having an upstanding necked opening in a top wall, wherein the cover has a relatively large portion forming a stopper for said opening.

6. A leakproof transmitter as recited in claim 5, wherein the bore of the cover is enlarged around the upper part of the straight portion of the shaft to receive a lubricant between said cover and shaft.

7. A leakproof transmitter as recited in claim 4, wherein the lower end of the cover portion is ball-shaped and of greater extent than a hemisphere, connected to the remainder by a neck, there is a disc secured to the upper end portion of a shaft, and said disc has a pocket in its upper surface, offset from the shaft axis and matingly receiving the ball-shaped end of said cover portion so as to be driven thereby.

8. A leakproof transmitter as recited in claim 7, wherein there is an upwardly opening housing for said disc, in a lower wall of which the shaft is journalled, and the means for clamping the flange of the first-mentioned housing also holds the upwardly opening housing in place.

References Cited by the Examiner

UNITED STATES PATENTS

| | | | |
|---|---|---|---|
| 1,339,513 | 12/1921 | Nyberg | 259—122 |
| 1,501,870 | 7/1924 | Schranz | 259—118 |
| 2,860,933 | 11/1958 | Wolff | 74—17.8 X |
| 3,209,387 | 10/1965 | Lukesch | 259—122 X |
| 3,251,635 | 5/1966 | Phillips | 259—122 X |

FOREIGN PATENTS 594,923  11/1947  Great Britain.

WILLIAM I. PRICE, *Primary Examiner.*